Patented Aug. 7, 1928.

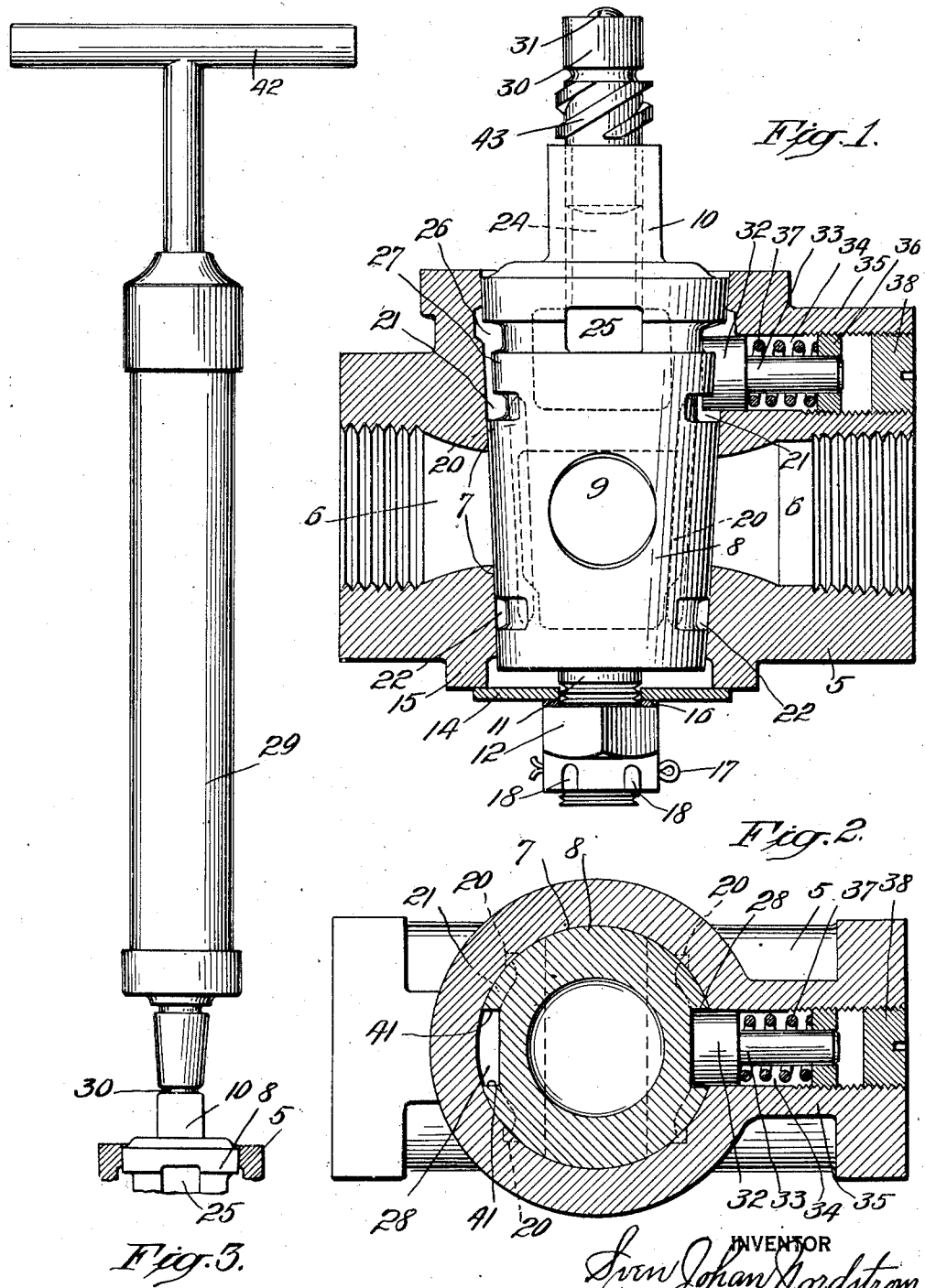

1,679,370

UNITED STATES PATENT OFFICE.

SVEN JOHAN NORDSTROM, OF OAKLAND, CALIFORNIA, ASSIGNOR TO MERCO NORDSTROM VALVE COMPANY, OF SAN FRANCISCO, CALIFORNIA, A CORPORATION OF DELAWARE.

VALVE.

Application filed April 30, 1927. Serial No. 187,729.

The invention relates to an improvement in valves, and more particularly to an improvement in plug valves provided with means for preventing manipulation of the valve except by those whose duty it is to open and close it.

It has been proposed heretofore to provide valves with means to prevent unauthorized persons from manipulating the valves either to open or to close them, and to this end valves have been provided with various kinds of locking devices. Some of these devices have proved effective and others ineffective. The effective devices as heretofore constructed are objectionable because of cost or because they have been found too complicated for general use. One object of the present invention is to provide an improved valve having provision whereby the movable member is locked against manipulation except by an operator provided with the requisite tool. Another object of the invention is to produce a plug valve with an improved and simplified locking device which is efficient and is cheaper to manufacture than those heretofore used or proposed. To these ends the invention consists in the improved valve hereinafter described and particularly pointed out in the appended claims.

In the accompanying drawings illustrating the preferred form of the invention, Fig. 1 is a longitudinal section taken through the improved valve; Fig. 2 is a transverse section of the upper part of the valve shown in Fig. 1; and Fig. 3 is a detail showing a pressure gun attached to the valve stem.

The locking device of the present invention, as illustrated in the drawings, is embodied in a plug valve of the pressure lubricated type, and is of such construction and arrangement that when the valve is closed the plug is held locked until an operator equipped with the proper kind of tool for lubricating the valve attaches the tool to the valve and operates it, thereby actuating the locking device to unlock the plug and permit it to be turned to open position.

The plug valve in which the improved locking device of the present invention is embodied comprises a casing 5 having a longitudinal passageway 6 therethrough and a tapered valve seat 7 formed transversely of the passageway 6. The valve seat 7 is open at the upper and lower sides of the casing 5 and in the valve seat is located a tapered plug 8 having a hole 9 adapted to register with the passageway 6, a valve stem 10 projecting through the upper side of the casing and a nut stem 11 projecting through the lower side of the casing. The nut stem 11 is threaded to receive the nut 12, and a flexible washer 14 is interposed between the annular flange 15, formed on the underside of the casing, and the nut 12 whereby the plug 8 is resiliently held against the tapered valve seat 7. An anti-friction washer 16 is interposed between the bottom side of the resilient washer 14 and the upper side of the nut 12. In order that the nut 12 may be held against accidental displacement the lower end of the nut stem 11 is drilled to receive a cotter pin 17, the outer ends of which are adapted to be received in the slots 18 cut in the lower or outer side of the nut 12.

The lubricating system of the valve comprises four vertically arranged lubricating grooves 20 formed in the valve seat 7 of the casing 5 and spaced substantially 90° apart. The grooves 20 are each spaced substantially equi-distant from the adjacent side of the passageway 6. The lubricant is supplied to the grooves 20 from a pair of arcuate grooves 21 formed on opposite sides of the larger end of the plug 8. A corresponding pair of arcuate grooves 22 are formed on opposite sides of the smaller end of the plug. The grooves 21 and 22 are substantially 90° in length and are so located relatively to the hole 9 through the plug that the ends thereof bridge and thereby connect the grooves 20 only when the plug is in substantially its closed and open positions. The lubricant is fed into the lubricating grooves 20, 21 and 22 from a reservoir 24 formed longitudinally in the valve stem 10 and communicating at its inner end by the transverse hole 25 in the larger end of the plug 8 with the cooperating circumferential grooves 26 formed in the larger end of the plug and the adjacent part of the casing. The lubricant in the grooves 26 forms a seal which prevents leakage to the atmosphere and the lubricant is supplied from the grooves 26 to the grooves 21 by cutting the part 27 of the larger end of the plug lying between the grooves 26 and the grooves 21 to form the vertical grooves or recesses 28. The lubricant is introduced into the reservoir 24 by a pressure gun 29, of usual construction, which is adapted to be attached to the fitting 30, provided with the check valve 31, fixed in the outer end of the valve stem 10. Although the pressure gun 29 is described as "of usual construction," it will preferably be of a type not ordinarily found in household use.

The improved locking device for preventing the manipulation of the plug 8 when it is supposed to remain in closed position, as shown in Fig. 1, comprises a bolt consisting of a head 32 and a shank 33. The head 32 of the bolt is slidingly received in a bore 34 in a housing 35 formed on the upper side of one end of the casing 5. The outer end of the shank 33 of the bolt is slidingly received in a guide consisting of a washer 36 threaded into the outer end of the bore 34. A coiled expansion spring 37 loosely surrounding the shank 33 of the bolt and pressing at its inner end against the outer face of the head 32 and at its outer end against the inner face of the guide 36 yieldingly forces the bolt toward the plug 8. A plug 38 closes the outer end of the bore 34 when the parts of the locking device have been assembled.

When the bolt is in locking position, preventing rotation of the plug 8 in the casing 5, the inner end of the head 32 of the bolt is received in one of the recesses 28 and the outer end of the head 32 of the bolt is held by the inner end of the bore 34. The lateral sides 41 of the recesses 28 are parallelly arranged and the head 32 of the bolt is cylindrical. Consequently, turning the plug 8 by the shank 10 can not force the head 32 of the bolt out of a recess 28 against the action of the spring 37. The bolt can not be reached from the exterior of the valve to pull the head 32 thereof out of a recess 28 in the plug because the guide 36 prevents a tool from being fastened on the outer end of the shank 33 of the bolt, even though the plug 38 is removed.

Unlocking the valve to permit the valve plug 8 to be turned to open position is accomplished by putting the lubricant in the lubricating system under pressure. This is done by attaching the pressure gun 29 to the fitting 30 and operating the gun in the usual manner, that is, by turning the handle 42 thereof to force lubricant out of the gun and into the lubricating system of the valve. While the lubricant in the lubricating system of the valve is under pressure the lubricant which enters the space between the inner face of the head 32 of the bolt and the adjacent part of the bottom of the recess exerts its pressure to push the bolt outwardly against the action of the spring 37, freeing the head 32 of the bolt from the sides 41 of the recess and permitting the plug 8 to be turned by applying a wrench to the valve stem 10. In practice, however, the plug 8 will be turned during the manipulation of the pressure gun by the operator. The mouth or nozzle of the gun fits over the device 30 and the threads in the nozzle of the gun engage with the threads 43 on the device 30. As the operator turns the handle of the pressure gun to force the lubricant out of the gun and into the lubricating system of the valve, the turning force exerted on the handle of the gun will be sufficient to turn the gun and valve plug 8 immediately the head 32 of the bolt is forced out of the recess 28. To lock the valve it is simply necessary to turn the plug 8 in reverse direction from open position to closed position, or the plug 8 may be turned in one direction until the other recess 28 is brought opposite the head 32 of the bolt.

Having thus described the invention what I claim as new is:—

1. A valve comprising a casing having a passageway therethrough and a tapered plug seat formed transversely of the passageway, a tapered plug seated in the plug seat and having a hole adapted to register with the passageway, a cylindrical bolt slidingly mounted in the casing, means for yieldingly pressing the bolt toward the plug, a recess in the plug adapted to receive the inner end of the bolt to lock the plug in the casing, a lubricant reservoir in the plug communicating with the recess, and means for putting the lubricant under pressure to cause the lubricant to act against the inner end of the bolt and thereby force it out of the recess to permit the plug to be turned.

2. A valve comprising a casing having a passageway therethrough and a tapered plug seat formed transversely of the passageway, a tapered plug seated in the plug seat and having a hole adapted to register with the passageway, a bolt slidingly mounted in the casing, a recess in the plug adapted to receive the inner end of the bolt to hold the plug against movement in the casing, means in the plug communicating with the recess for containing fluid substance, and means for putting pressure on the fluid substance to act against the inner end of the bolt and thereby force the bolt out of the recess to permit the plug to be moved.

3. A valve comprising a casing having a passageway therethrough, a plug seated in the casing and having a hole adapted to register with the passageway, a bolt movably mounted in the casing, a recess in the plug adapted to receive the inner end of the bolt to hold the plug against movement, means in the plug for containing fluid substance, and means for putting the fluid substance under pressure to force the bolt out of the recess to permit the plug to be moved.

4. A valve comprising a casing having a passageway therethrough, a movable member mounted in the casing to control the passageway, a bolt movably mounted in the casing and having its inner end received in a recess in the movable member to prevent movement of the movable member in the casing, means communicating with the recess for containing fluid substance, and means for putting the fluid substance under pressure to force the bolt out of the recess to permit the movable member to be moved.

5. A valve comprising a stationary member and a movable member, a bolt movably supported in one of the members, one end of the bolt being adapted to be received in a recess in the other member to hold the two members against relative movement, means for containing a fluid substance communicating with the recess in which the end of the bolt is received, and means for putting the fluid substance under pressure to force the bolt out of the recess to permit the movable member to move relatively to the stationary member.

SVEN JOHAN NORDSTROM.